(12) United States Patent
Mauletti et al.

(10) Patent No.: US 11,434,081 B2
(45) Date of Patent: Sep. 6, 2022

(54) AUTONOMOUS VEHICLE, SUCH AS AN AUTOMATED GUIDED VEHICLE OR AN AUTONOMOUS MOBILE ROBOT

(71) Applicant: Comau S.p.A., Grugliasco (IT)

(72) Inventors: Enrico Mauletti, Grugliasco (IT); Enrico Rui, Grugliasco (IT); Mauro Berzano, Grugliasco (IT); Ivan Lazzero, Grugliasco (IT); Simone Romeo, Grugliasco (IT)

(73) Assignee: Comau S.p.A., Grugliasco (IT)

( * ) Notice: Subject to any disclaimer, the term of this patent is extended or adjusted under 35 U.S.C. 154(b) by 553 days.

(21) Appl. No.: 16/559,684

(22) Filed: Sep. 4, 2019

(65) Prior Publication Data

US 2020/0071084 A1   Mar. 5, 2020

(30) Foreign Application Priority Data

Sep. 5, 2018   (EP) .................................... 18192747

(51) Int. Cl.
| | | |
|---|---|---|
| *B65G 17/00* | (2006.01) | |
| *G05D 1/00* | (2006.01) | |
| *G05D 1/02* | (2020.01) | |

(52) U.S. Cl.
CPC ......... *B65G 17/005* (2013.01); *G05D 1/0088* (2013.01); *G05D 1/0287* (2013.01); *G05D 1/0263* (2013.01); *G05D 2201/0216* (2013.01)

(58) Field of Classification Search
CPC .. B65G 17/005; G05D 1/0088; G05D 1/0287; G05D 1/0263; G05D 2201/0216; B62D 65/022; B62D 63/025; B62D 63/04; B62D 65/18; B25J 5/007; B60K 1/02
See application file for complete search history.

(56) References Cited

U.S. PATENT DOCUMENTS

| | | | |
|---|---|---|---|
| 4,359,116 A | 11/1982 | Mankey | |
| 8,869,370 B2 | 10/2014 | Kilibarda | |
| 9,581,983 B2 | 2/2017 | Kilibarda et al. | |
| 2011/0231050 A1* | 9/2011 | Goulding | B62D 57/032 180/8.1 |
| 2012/0216384 A1 | 8/2012 | Immekus | |
| 2019/0135549 A1 | 5/2019 | Kilibarda et al. | |
| 2019/0161329 A1 | 5/2019 | Ghirardi et al. | |

FOREIGN PATENT DOCUMENTS

| | | |
|---|---|---|
| AT | 7749 U1 | 8/2005 |
| GB | 1564669 A | 4/1980 |

\* cited by examiner

*Primary Examiner* — Rodney A Butler
(74) *Attorney, Agent, or Firm* — Young Basile Hanlon & MacFarlane, P.C.

(57) ABSTRACT

An autonomous vehicle, for example, an automated guided vehicle or an autonomous mobile robot, has a support structure having a general double-hull configuration, with two separate longitudinal hulls, parallel to each other and transversely spaced apart, and at least two bridge structures that connect the hulls to each other. The aforesaid bridge structures have ends connected to the two hulls by interposition of elastic joints, in such a way that the two hulls are free to perform differentiated oscillating movements so as to allow the front wheels and the rear wheels of the vehicle to remain in contact with the surface on which the vehicle is moving, even when this surface has irregularities and/or slope variations.

21 Claims, 15 Drawing Sheets

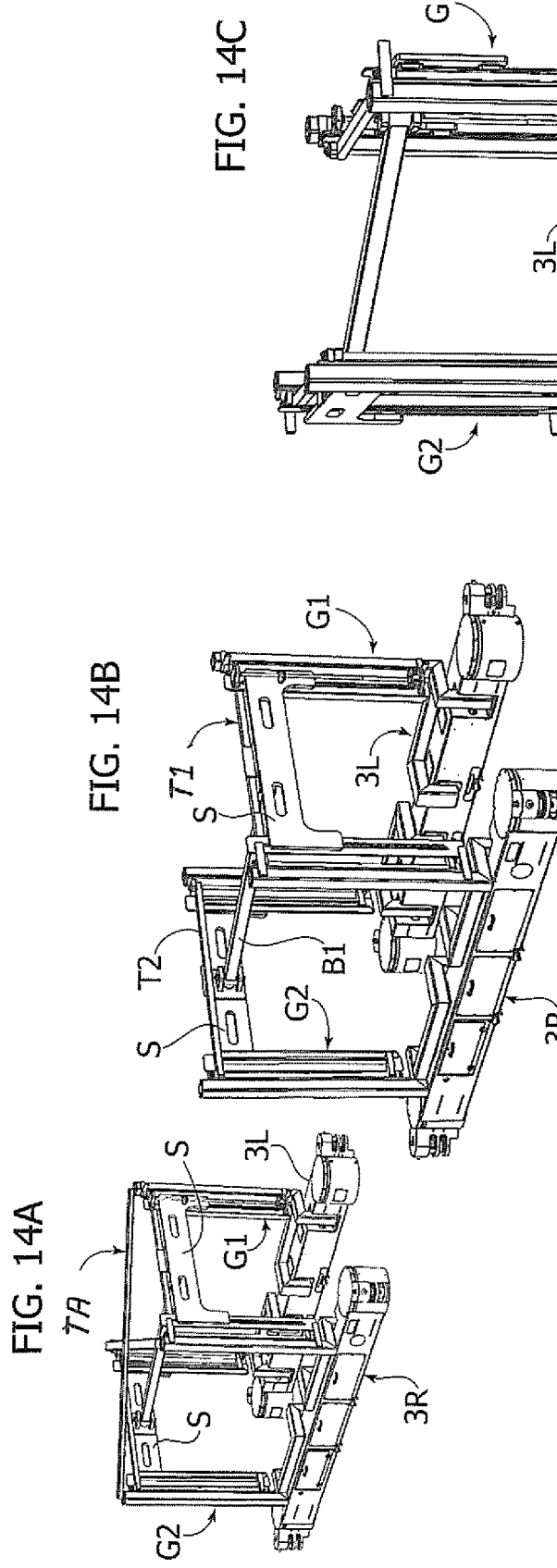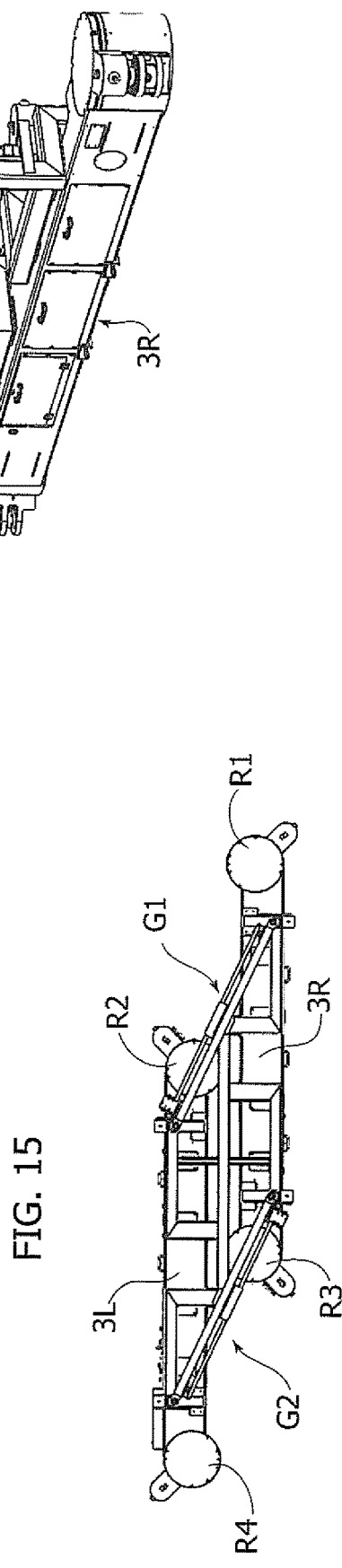

AUTONOMOUS VEHICLE, SUCH AS AN AUTOMATED GUIDED VEHICLE OR AN AUTONOMOUS MOBILE ROBOT

CROSS-REFERENCE TO RELATED APPLICATIONS

The present invention claims priority benefit to European Application No. 18192747.6 filed Sep. 5, 2018 the entire contents of which is incorporated herein by reference.

FIELD OF INVENTION

The present invention refers in general to autonomous vehicles, including with this expression both the so-called Automated Guided Vehicles (AGV) and the so-called Autonomous Mobile Robots (AMR). According to a conventional distinction, AGVs typically require the provision of an infrastructure, for example, in the form of magnetic floor strips or navigation lights (beacons) for guiding the vehicle along a given route. AMRs instead move using a navigation system and a processor that are on board the robot. AMRs are able to perceive the environment in which they move and make decisions based on what they perceive and how they have been programmed, for example, stopping, re-starting and maneuvering around obstacles that they encounter along their path.

The invention is aimed at any category of autonomous vehicle (such as an automated guided vehicle or an autonomous mobile robot) of the type described above, particularly for use in an industrial environment. Moreover, the use of the invention outside the industrial field is not excluded.

More specifically, the invention relates to an autonomous vehicle or autonomous mobile robot of the type comprising:
- a support structure,
- a plurality of wheels on which said support structure is carried,
- at least one electric motor carried by the support structure, for actuating at least one of said wheels, and
- one or more electronic control circuits carried by the support structure.

BACKGROUND

Vehicles of the above type have been known and used for some time in the industry for various applications. For example, in the automotive industry, since the late 1970s (see, for example, FIG. 3 of the document GB 1 564 669 A, of which the same Applicant owns), assembly plants for motor-vehicles are known in which the structure of a motor-vehicle was transported by means of an AGV through a series of assembly stations, not necessarily arranged in line. With the exponential increase that has occurred in recent years in the investment costs necessary to produce new vehicles, the above-mentioned techniques have become of increasing interest, as they allow, especially in the case of producing high-end vehicles, where the number of vehicles to be produced in the time unit is relatively small, the abandonment of the conventional scheme of a large in-line production plant and instead exploitation of production plants with a leaner and more modular layout, easily reconfigurable according to new production needs and/or easily transportable even to a different site, to respond to new market demands.

As part of these developments, there is a need for the new generation of autonomous vehicles that can respond fully to these needs.

SUMMARY

It is therefore an object of the present invention to provide an autonomous vehicle which can operate efficiently and reliably and which—at the same time—has an extremely simple and low-cost structure.

Another object of the invention is to provide an autonomous vehicle having a structure constituted according to modularity criteria, so as to be easily adaptable and/or reconfigurable according to the application for which it is intended.

An additional, more particular object of the invention is that of producing an autonomous vehicle which guarantees a safe and reliable transport of the structures or components that are arranged thereon, in particular guaranteeing a correct and constant contact of all the wheels of the vehicle with the surface on which the vehicle moves, without however requiring the provision in the vehicle of elaborate and expensive suspension systems.

An additional object of the invention is to provide an autonomous vehicle which can be configured so as not to interfere with obstacles placed along its path, for example, by passing over or straddling them.

An additional object of the invention is to provide an autonomous vehicle which can also be quickly converted into a configuration of reduced size, to facilitate transport.

Finally, another object of the invention is to achieve all the aforesaid objectives with a simple and economical construction and assembly structure.

In view of achieving one or more of the aforesaid objects, the invention relates to a vehicle of the type indicated at the beginning of the present description, in one example, the invention includes:
- the support structure has a general double-hull configuration, with two separate hulls, parallel to each other and transversely spaced apart, and at least two bridge structures which connect said hulls to each other,
- the vehicle comprises two front wheels and two rear wheels respectively located near the front and rear ends of the two hulls,
- the aforesaid at least two bridge structures have ends connected to the two hulls by interposition of elastic joints,
- in such a way that the two hulls are free to perform differentiated oscillating movements so as to allow the two front wheels and the two rear wheels to remain in contact with the surface on which the vehicle moves, even when this surface has irregularities and/or slope variations.

Thanks to the above characteristics, the two hulls that are part of the vehicle structure are able to perform differentiated oscillations, to allow the wheels to follow the irregularities and slope variations of the surface on which the vehicle moves, the hulls themselves being configured to follow the profile of the ground by gravity, or by their own weight, or in any case due to the weight of the equipment carried by the vehicle. The aforesaid result is obtained without the need to associate sophisticated (and consequently expensive) suspension systems with the vehicle wheels.

In a preferred embodiment, the front wheels and the rear wheels form part of wheel assemblies constituting separate modules, rigidly connected to the front ends and to the rear ends of the two hulls forming part of the vehicle structure, respectively. Preferably, two of the wheel assemblies each comprise a steering and drive wheel and include a first electric motor for driving the wheel and a second electric motor for steering the wheel. The other two wheel assemblies each comprise a pivoting non-drive wheel.

Again in the case of the aforesaid non-exclusive, preferred embodiment, the two hulls each have a structure of metal material, comprising an upper wall, a lower wall and two side walls. Preferably, each hull has one or more containment spaces, provided with openable doors, to contain one or more electronic processing and control units and the relevant wiring, as well as one or more electric batteries for powering the electric motors of the wheels.

According to a further preferred characteristic of the invention, the aforesaid at least two bridge structures comprise a first cross-member and a second cross-member each having a tubular cylindrical body with two opposite ends connected to the two hulls by interposition of two elastic joints each including an annular body of elastomeric material, coaxial to the cylindrical body of the cross-member.

According to a further preferred characteristic, the aforesaid at least two bridge structures each also comprise a first and a second tool support plate, arranged in horizontal planes and having each opposite end resting on support surfaces of the two hulls, and which are each connected to the respective support surface by the interposition of one or more elastic supports of elastomeric material. In the preferred embodiment, wherein each hull has a metal structure comprising an upper wall, a lower wall and two side walls, the support surface of each tool support plate on the hull is defined by a bottom wall of a recess formed on an inner side of the hull and open on both the inner side and the upper side of the hull.

The exemplary "base" configuration of the vehicle according to the invention can, of course, be provided with any type of equipment that makes it suitable for a specific application. For example, a lifting device ("lifter") of any type can be arranged on each support plate, configured to vary the height of a structure carried above the vehicle.

Preferably, the two hulls also comprise a plurality of auxiliary wheels with multiple rolling elements, of the type known as "omni-wheels".

Thanks to each and all the above characteristics, the vehicle is able to meet the needs of an efficient and reliable operation, and in particular the need to ensure that all the wheels of the vehicle always remain in contact with the surface on which the vehicle moves, even when this surface presents irregularities or slope variations, without requiring—at the same time—the adoption of complex, heavy and expensive structures.

In an additional embodiment, the two bridge structures forming part of the vehicle according to the invention are in the form of two gantry structures, each including two uprights that rise vertically from the two hulls, and which have upper ends connected by a cross-member, in such a way that the space between the two hulls is completely free, each upright of each gantry structure having a lower end connected to a respective hull of the vehicle support structure by interposition of an elastic joint.

Thanks to the aforesaid characteristics, in this embodiment, the vehicle according to the invention is able to pass through an operative station without interfering with equipment arranged in said station, being able to overcome the obstacle by positioning itself astride it.

Preferably, in this embodiment, the two cross-members of the two gantry structures are connected to each other by an upper frame.

In the case of this embodiment as well, the exemplary "base" configuration of the vehicle can also be provided with any type of equipment which makes it suitable for a specific application. Purely by way of example, on the uprights of both the gantry structures, respective sliding members can be mounted in a vertically slidable manner, rigidly connected to each other by an interconnection structure. These sliding members form a vertically-movable apparatus which can, for example, be lowered once the vehicle is in a working position in an assembly station of an industrial plant, in order to allow operations to be carried out on a structure carried by this vertically-movable apparatus.

According to an additional variant of the invention, the support structure can be constituted in such a way as to be foldable in an inoperative configuration of reduced size, with the two hulls adjacent to one another. For example, in the specific case of the last embodiment mentioned above, on each upright of each gantry structure, an auxiliary upright is hinged about a vertical axis, to which the upper cross-member of the gantry structure is connected, in such a way that the vehicle is able to assume a configuration of reduced size, for example, to facilitate transport, in which the two hulls are adjacent to each other and the two gantry structures are arranged in inclined planes with respect to a plane perpendicular to the longitudinal direction of the hulls.

In the case of this embodiment, if an upper frame is provided connecting the two gantry structures, this upper frame is mounted in a removable manner, so that it can be removed before transforming the vehicle into the reduced space configuration.

Still in the case of this last embodiment, on the auxiliary uprights of both gantry structures, respective sliding members are mounted in a vertically slidable manner, and are connected to each other by an interconnecting beam having opposite ends articulated to the two sliding members about vertical axes, in such a way as to allow the vehicle to assume the reduced-size configuration mentioned above, with the two hulls adjacent to each other and the two gantry structures arranged in planes inclined with respect to planes perpendicular to the longitudinal direction of the hulls.

All of the aforesaid characteristics allow the vehicle to be transformed into a reduced-size configuration in an extremely rapid time, for example, in order to prepare for transportation to another production site. In this case as well, as we can see, this result is obtained with extremely simple and low-cost means.

The exemplary "base" configuration of the vehicle according to the invention, in the version with a gantry structure can also be arranged with robotized arms carried, directly or indirectly, by the two gantry structures. This variant can, for example, be exploited in a plant comprising an assembly line, a plurality of AGVs arranged to proceed along said line and to receive components thereon. The vehicle carrying the robotic arms can be positioned astride the assembly line and programmed to pick up components from stationary positions at the side of the line and to deposit them on the AGVs that proceed along the line. The combination of two types of autonomous vehicles allows optimization of efficiency, taking advantage of their respective specificities.

BRIEF DESCRIPTION OF THE DRAWINGS

Further characteristics and advantages of the invention will become apparent from the description that follows with reference to the attached drawings, provided purely by way of non-limiting example, wherein:

FIGS. 14A, 14B, and 14C illustrate the vehicle of FIG. 10 in three successive steps of an exemplary operation necessary to transform the vehicle into a configuration of reduced size, suitable for transport;

FIG. 15 is a plan view of the vehicle of FIG. 10 in the reduced-size configuration;

DETAILED DESCRIPTION

Figure 1:
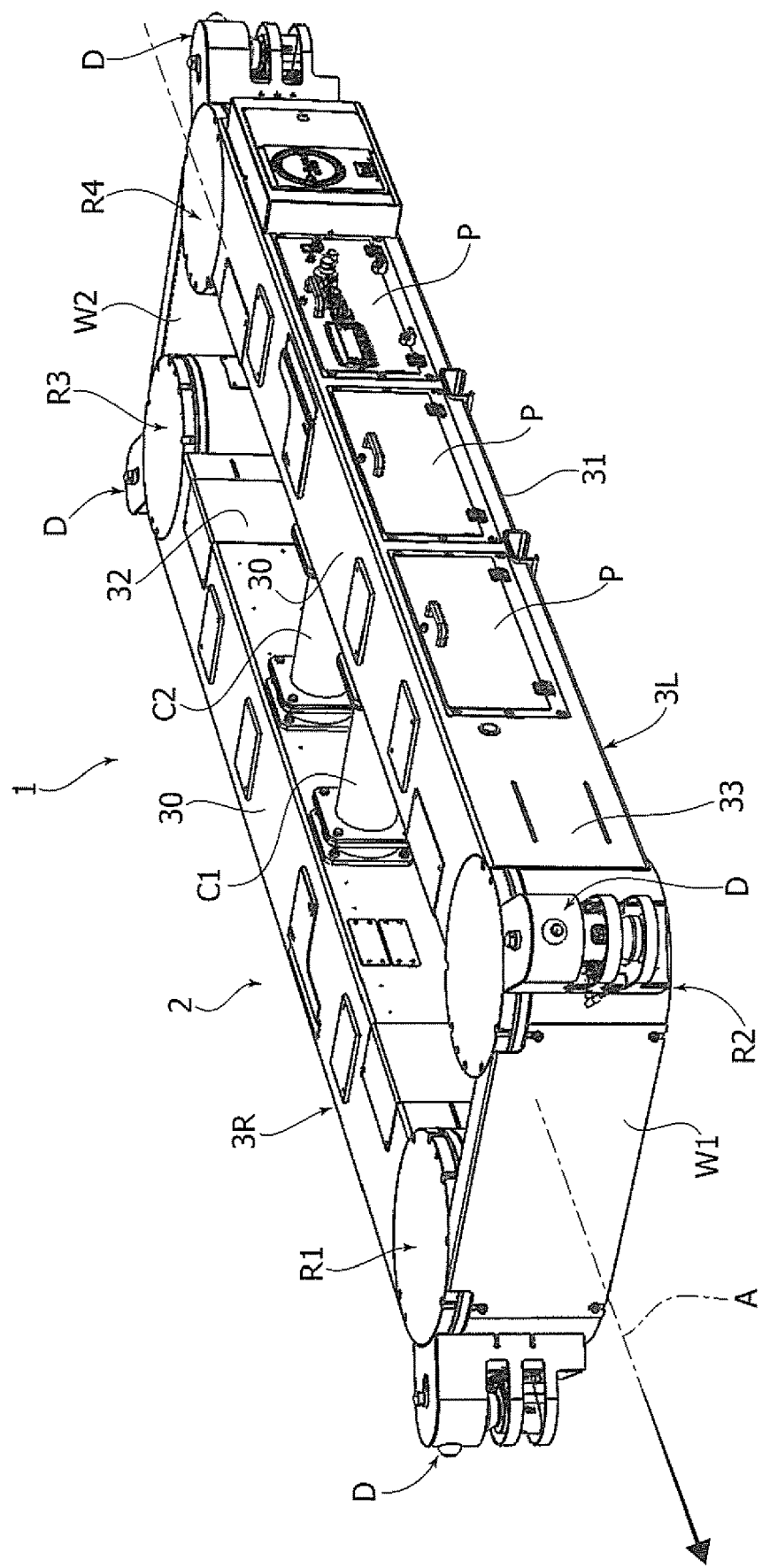
FIG. 1 is a front perspective view of a first embodiment of a vehicle according to the present invention.
Figure 2:
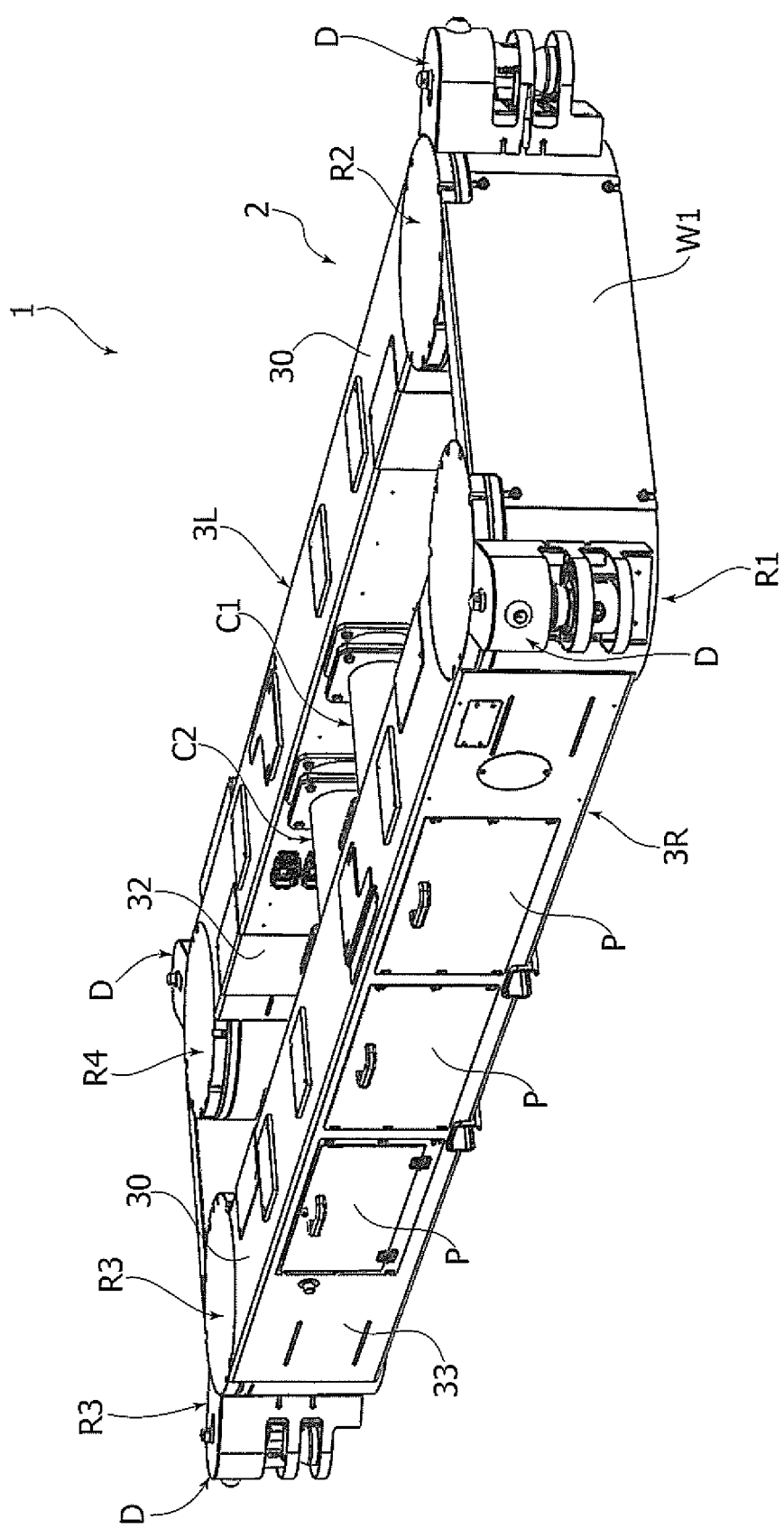
FIG. 2 is an additional rear perspective view of the vehicle of FIG. 1.
Figure 3:
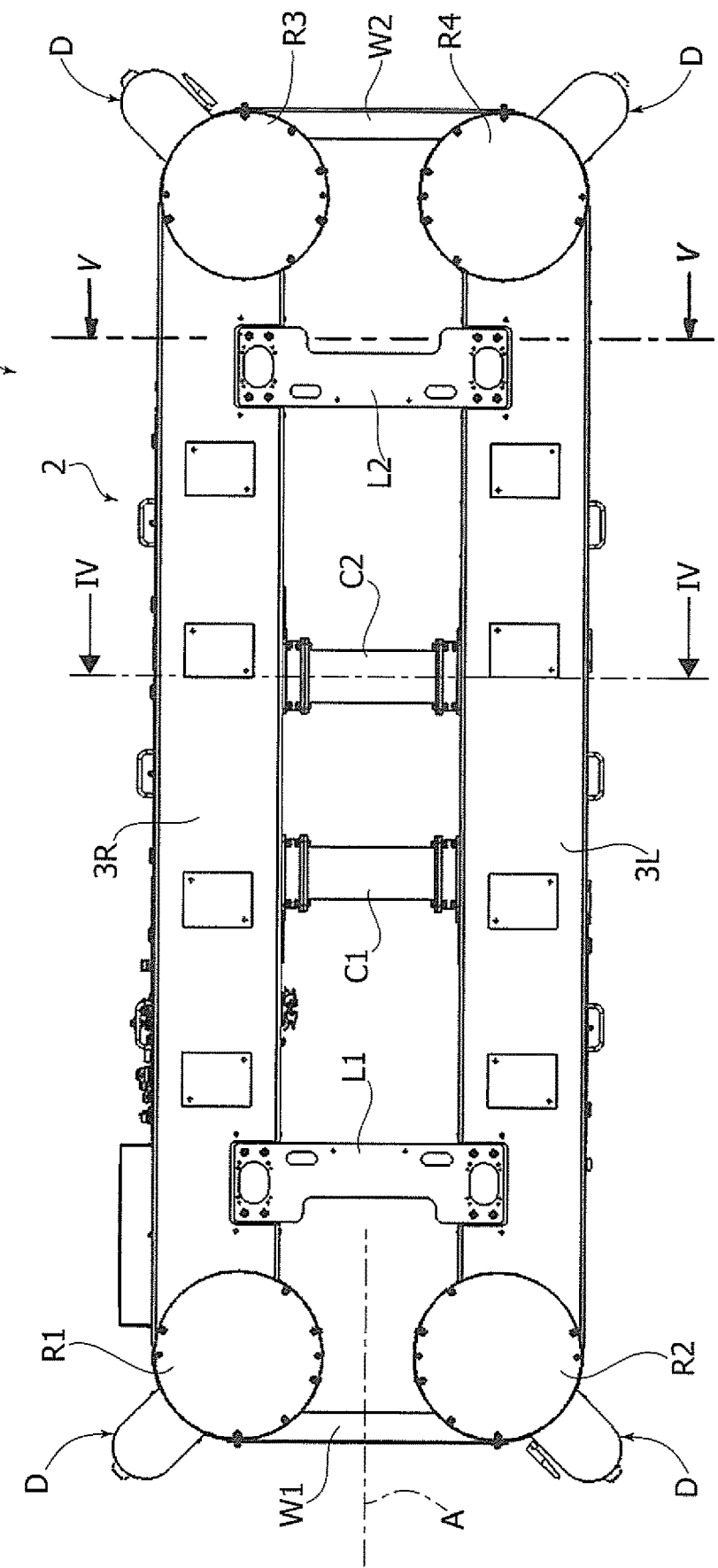
FIG. 3 is a plan view of the vehicle of FIGS. 1 and 2.

With reference to FIGS. 1-3, numeral 1 indicates—in its entirety—an autonomous vehicle, in the exemplary form of an automated guided vehicle (AGV) or autonomous mobile robot (AMR) (collectively referred to as an autonomous vehicle or vehicle) in an exemplary use in an industrial plant, in particular in a motor-vehicle assembly plant, for transporting a motor-vehicle structure, for example a motor-vehicle body or a body subassembly through one or more assembly stations, or for transporting, for example, any other motor-vehicle component or subassembly through one or more machining and assembly stations. As already indicated above, it must however be understood that the vehicle according to the invention is of general application, both in the industrial field and in the non-industrial field.

The vehicle 1 comprises a support structure 2 mounted on wheels having a general double-hull configuration, with two separate hulls 3R, 3L, parallel to each other and transversely spaced apart, and a plurality of bridge structures (two shown) which connect said hulls to each other.

In the exemplary solutions illustrated here, the vehicle 1 is able to move in any direction and, in particular, both in a longitudinal main direction A and in a transverse direction, perpendicular to the main direction, being equipped with drive wheels which can also be steered by 90 degrees, and pivoting non-drive wheels. More generally, in a vehicle with steerable wheels, but not capable of being steered by 90 degrees, the two hulls 3L, 3R can be arranged in the aforesaid main advancing direction A (as illustrated in the drawings), or even in a transverse direction, perpendicular to the main advancing direction A.

In the embodiments illustrated here, each of the hulls 3R, 3L has a structure consisting of steel walls welded and/or screwed together and has an elongated configuration, with an upper wall 30, a lower wall 31, an inner side wall 32 and an outer side wall 33.

Figure 16A:
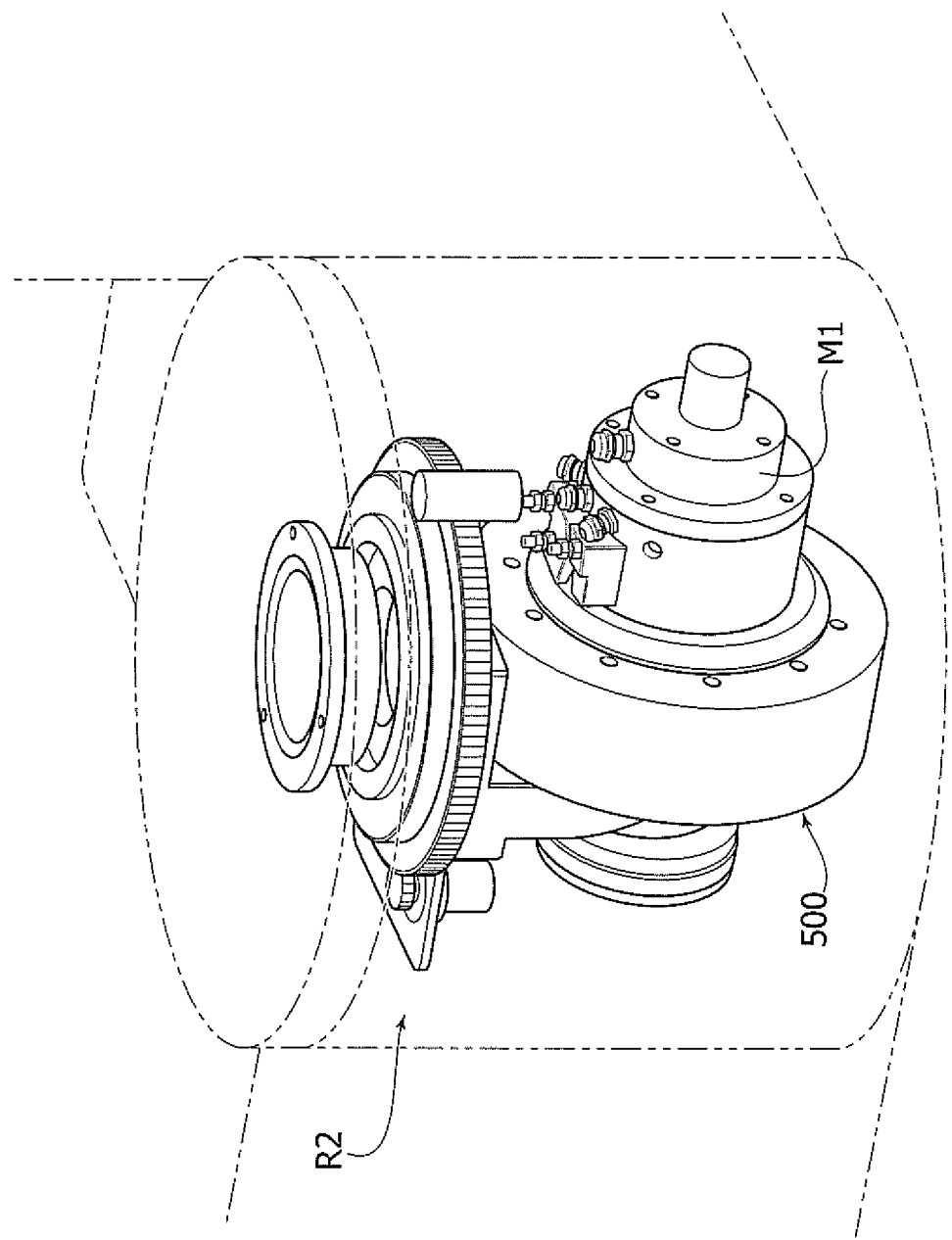
FIGS. 16A, 16B are two alternate perspective views of an embodiment of a drive-wheel assembly used in the vehicle according to the invention.
Figure 16B:
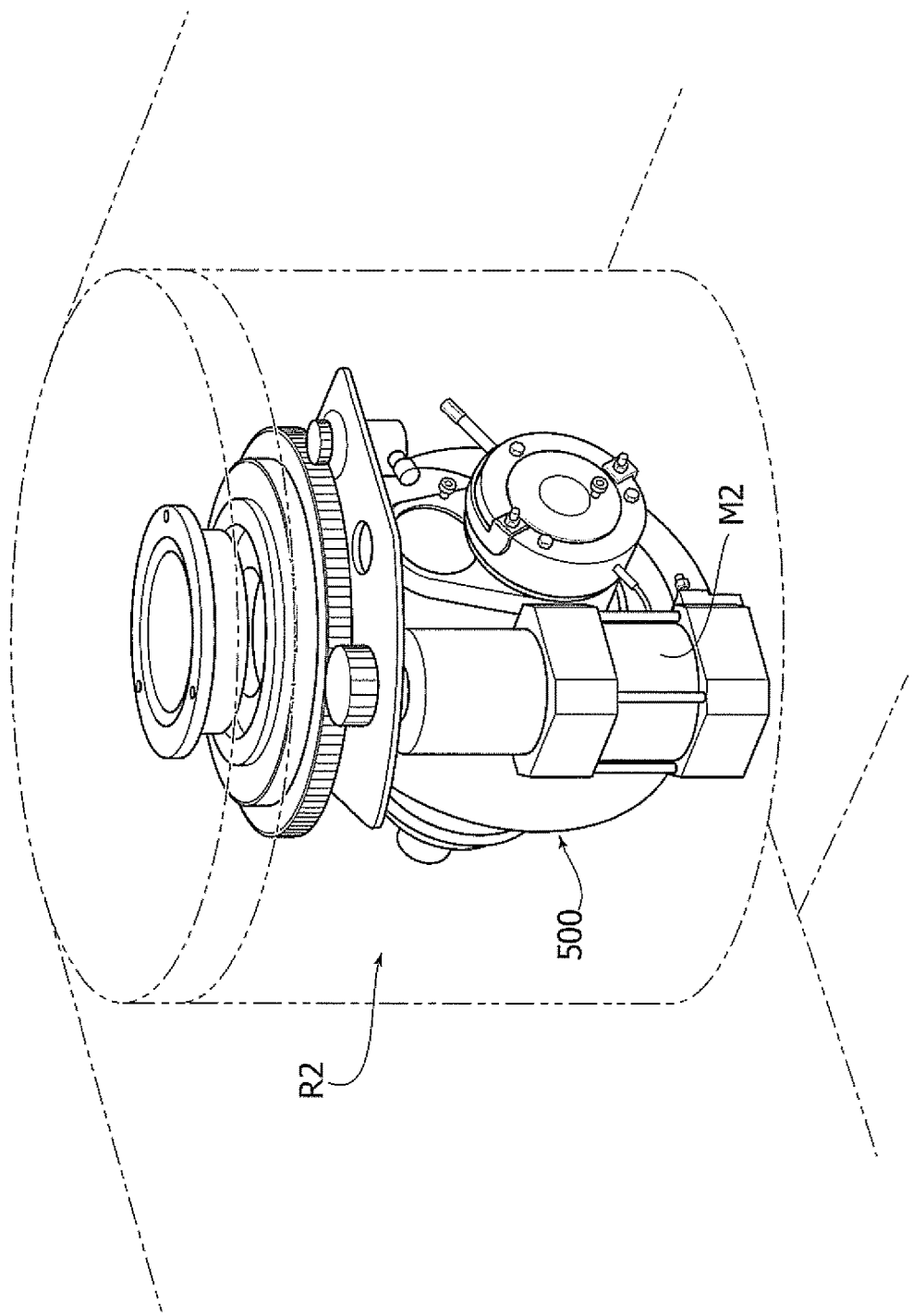

At the front and rear ends of the two hulls 3R, 3L, four respective wheel assemblies R1, R2, R3, R4 are rigidly connected. As can be seen in the drawings, each of said wheel assemblies has a casing having a general cylindrical configuration with a vertical axis. Two of these wheel assemblies, for example, the assemblies R2, R3 along the diagonal (but they could be the two front assemblies or the two rear assemblies or two assemblies carried by the same hull), carry a steering and drive wheel 500 (FIGS. 16A, 16B) and each includes a first electric motor M1 for driving the wheel 500 and a second electric motor M2 for steering the wheel.

The entire constituent module of each of the assemblies R1-R4 is itself commercially available and, taken separately, does not fall within the scope of the present invention. The other two wheel assemblies, for example, the assemblies R1, R4, only present a non-drive pivoting wheel and are therefore devoid of electric motors.

The vehicle 1 can be equipped with an autonomous driving system of any known type. Depending on whether it is an AGV or AMR (see the distinction at the beginning of this description), infrastructures can be provided, for example, in the form of magnetic strips on the ground or navigation lights (beacons) for guiding the vehicle along a determined route, or on-board navigation systems and processors can be provided in the vehicle, capable of perceiving the environment and consequently controlling the movement of the vehicle.

In the illustrated example, each of the aforesaid modules R1-R4 carries a device D which forms part of the driving and control system of the vehicle, which allows the vehicle to be driven according to any predetermined path on the floor of the plant in which it is used. These systems are known per se and enable control of the movement of the vehicle to be obtained, without the need for a vehicle guiding track to be provided on the floor of the plant, as was the case for the first-generation AGVs. For example, the guide and control systems may include, in a manner known per se to those skilled in the art, laser beam emitting and receiving devices configured to cooperate with a plurality of stationary reflectors arranged in the plant to constitute useful references for guiding the vehicle through the plant. The devices D can also include safety systems including proximity sensors and/or contact sensors to block the movement of the vehicle in the vicinity of any obstacle.

Inside the structure of the hulls 3R, 3L, containment spaces are obtained for one or more electronic control units of the vehicle, for electric batteries for powering the electric motors of the vehicle, for connection wiring to the electric motors and to the driving and safety systems of which the vehicle is provided, as well as for wireless transmission and reception units for connecting the on-board electronics of the vehicle with one or more stationary electronic controllers provided in the system or also with controllers in the form of portable computers, for example tablets, which can be used by operators of the plant.

The aforesaid containment spaces are accessible by means of openable doors P, as better shown in FIGS. 1, 2 and 6, 7.

With reference again to FIGS. 1-3, the structures of the two hulls 3R, 3L are connected to each other by means of two central cross-members C1, C2 having an exemplary cylindrical tubular body with opposite ends connected to the two hulls 3R, 3L by interposition of elastic joints.

Figure 4:
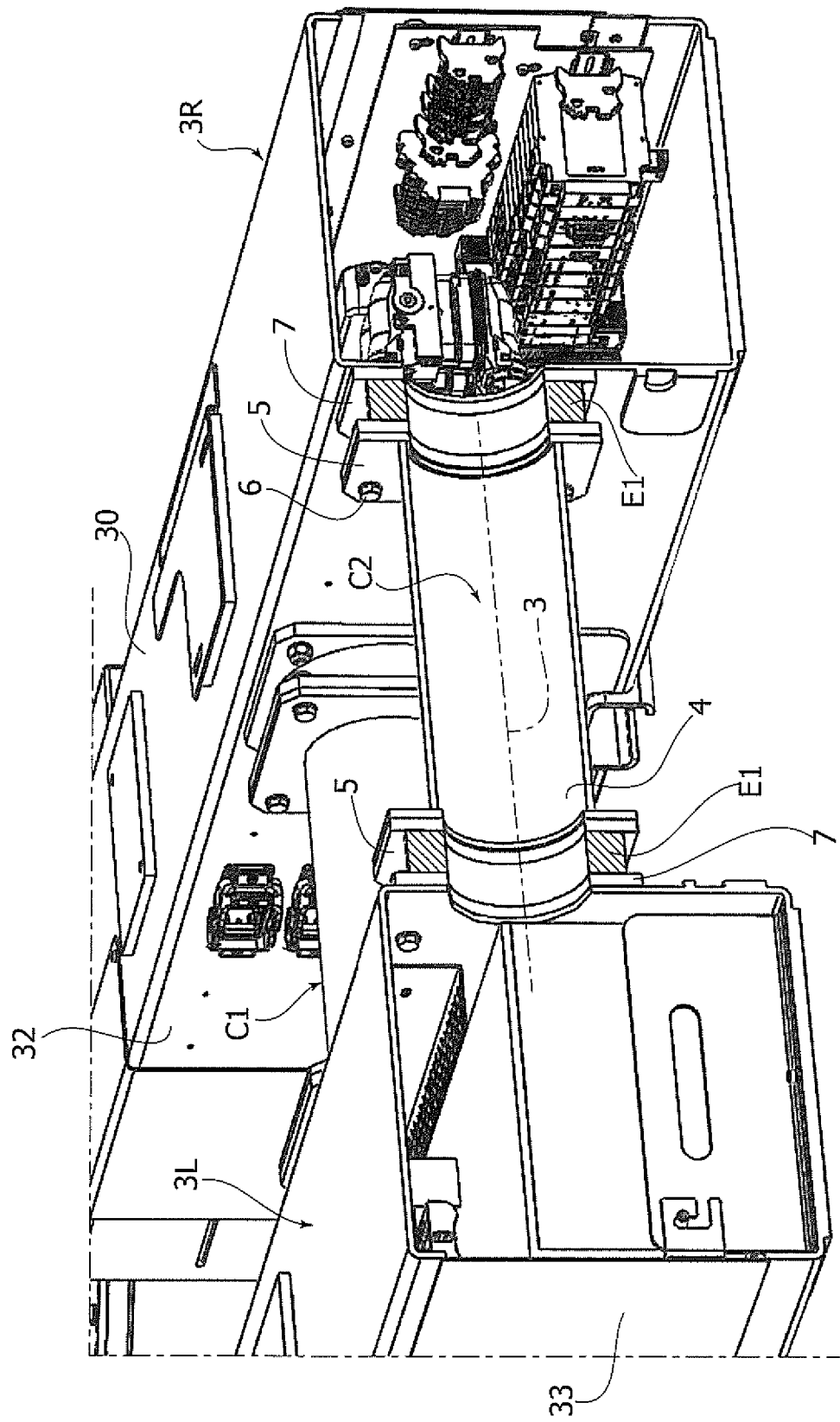
FIG. 4 is a partially cross-sectioned, partial perspective view of the vehicle of FIGS. 1-3.

As best seen in FIG. 4, each of the two cross-members C1, C2 has an exemplary cylindrical and tubular metal body whose axis 3 is transversely and perpendicularly directed with respect to the longitudinal direction A of the vehicle. Each end of the cylindrical body 4 is welded to a flange 5, in the form of a plate perpendicular to the axis 3. The flange 5 is connected by bolts 6 (see again FIG. 4) to a counterplate 7 welded to the structure of the respective hull 3R or 3L. Between the flanges 5, 7 an annular body of elastomeric material E1 is interposed.

The set of the two plates 5, 7 with the elastic annular body E1 constitutes an elastic joint which is capable of elastically deforming, both with respect to relative movements of the plates 5, 7 corresponding to a torsion about the axis 3, and to relative movements in the direction of the axis 3 or in a direction perpendicular to it. In this way, the elastic yielding is such as to have yields in preferential directions so as to make the vehicle adaptive only in the desired directions and, at the same time, sufficiently rigid in directions in which the overall geometry of the vehicle must be maintained.

Thanks to the aforesaid characteristics, the cross-members C1, C2 connect the two hulls 3R, 3L together, leaving them, however, free to have differentiated oscillations that allow the vehicle to remain with all four wheels in contact with the floor of the plant even when this floor presents irregularities and/or slope variations. During use, the structure of the vehicle 1 is forced by its own weight and/or the additional weight of the equipment carried on the vehicle, to follow the profile of the surface on which the vehicle moves, keeping all the wheels in contact with this surface, thanks to the possibility of differentiated oscillations of the two hulls 3R, 3L, which is given by the cross-members C1, C2 as well as by the additional connecting elements which are described hereinafter.

Figure 5:
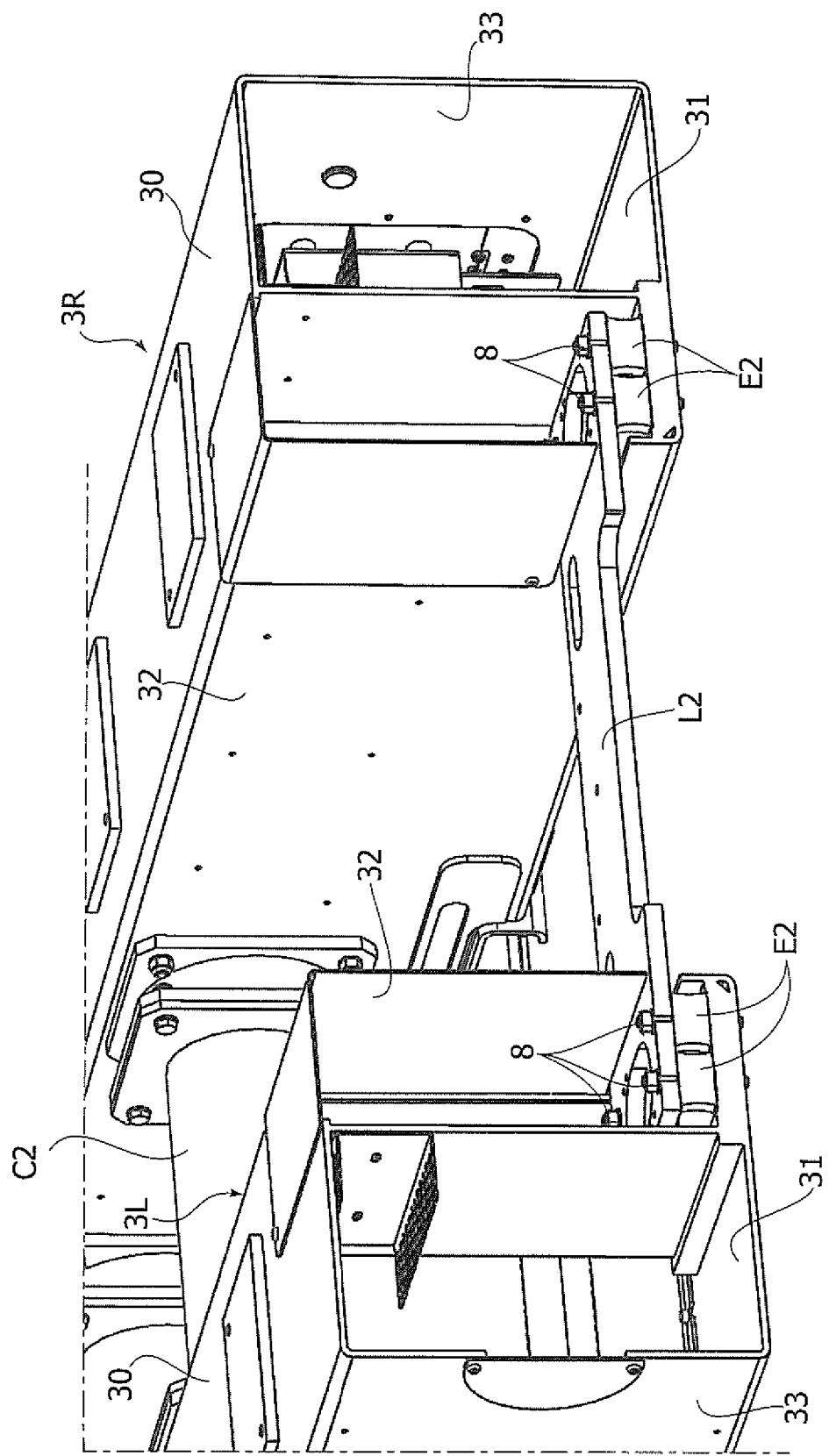
FIG. 5 is an additional partially cross-sectioned, partial perspective view of the vehicle taken along line V-V of FIG. 3.
Figure 6:
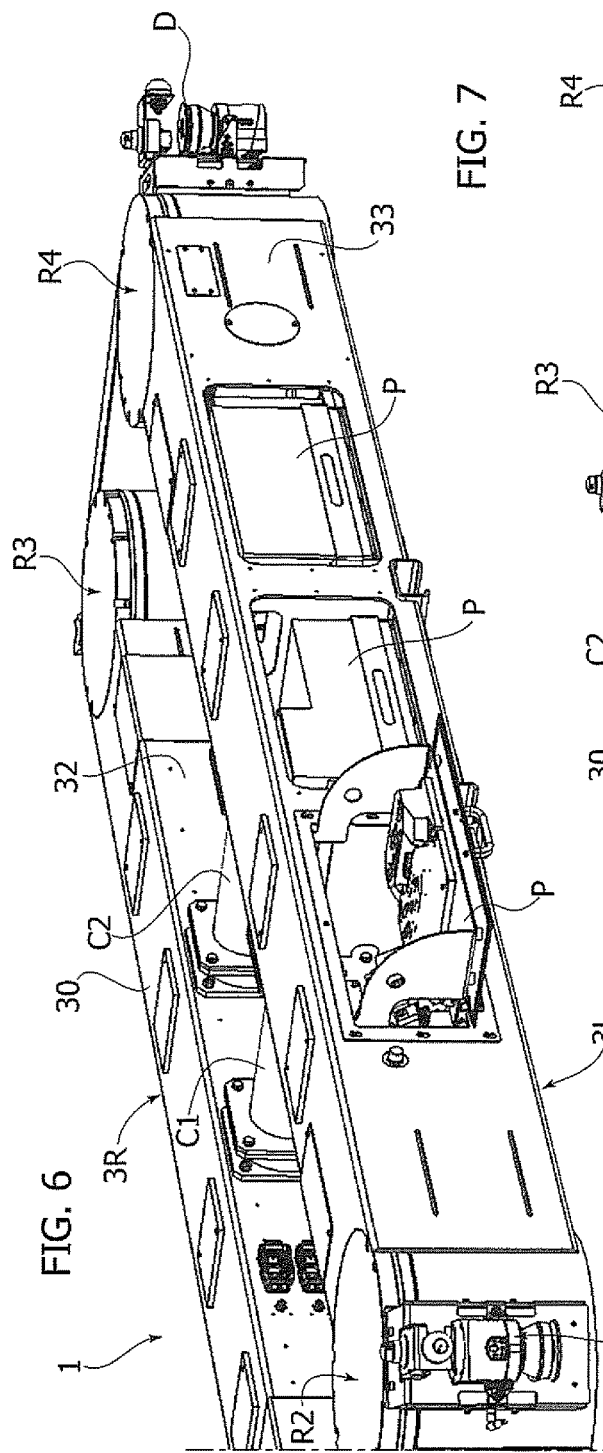
FIGS. 6, 7 are alternate perspective views of the vehicle of FIGS. 1-3 showing containment spaces defined within the vehicle structure, with the relative doors in the alternate open and closed conditions.
Figure 7:
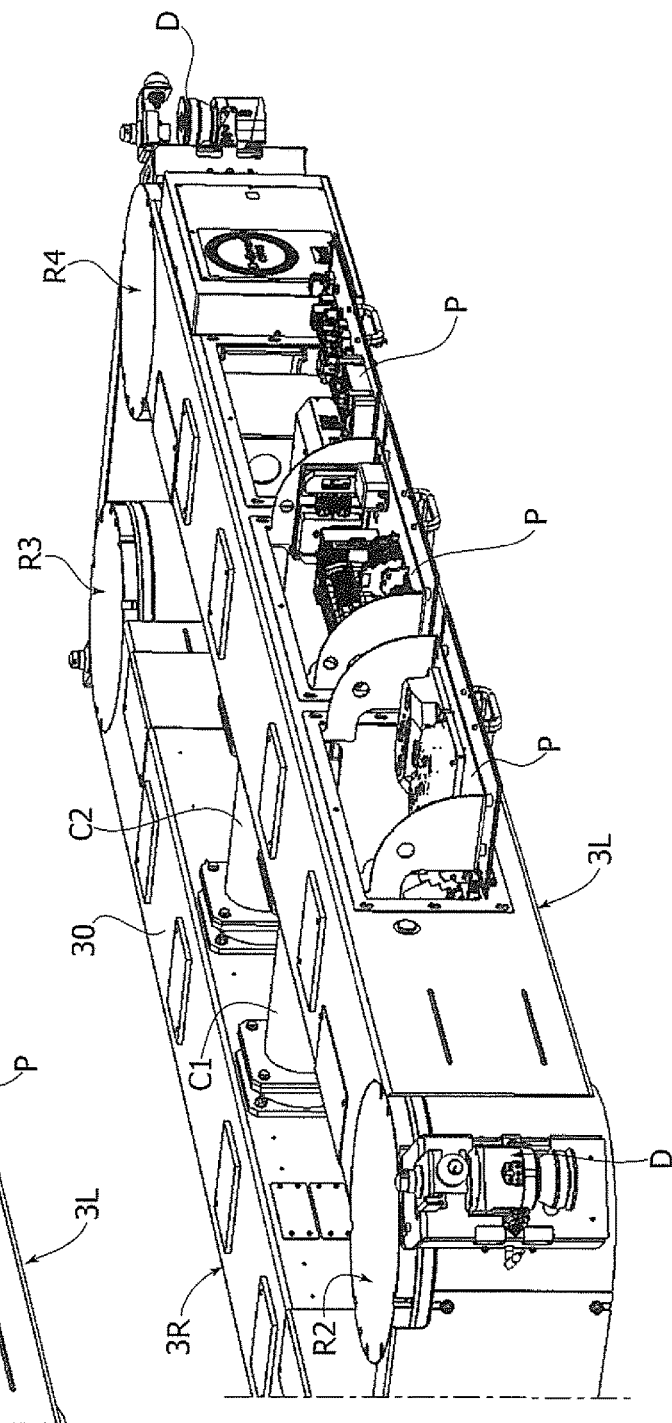

With reference in particular to FIGS. 3 and 5, the structures of the two hulls 3R, 3L are also connected to each other by two tool support plates L1, L2. The exemplary respective plates L1, L2 are steel plates, arranged in a horizontal plane just above the plane defined by the lower walls 31 of the two hulls 3R, 3L.

As can be seen in FIG. 5 for the plate L2, each of the ends of each of the plates L1, L2 extends into the inner space of the respective hull 3R or 3L, beyond the inner wall 32, and is secured by bolts 8 (FIG. 5) to the lower wall 31 of the hull by interposing blocks of elastomeric material E2.

As indicated above, the plates L1, L2 can be used to carry components and/or tools with which the vehicle 1 can be equipped, as well as to support parts to be transported on the vehicle itself.

In particular, each of the plates L1, L2 can be used to mount a lifting device of any known type (for example, a vertical-axis fluid cylinder or a pantograph-lifting device), which allows variation of the height position of the structure carried on the vehicle. The lowered position of the plates L1, L2 with respect to the plane of the upper walls 30 of the two hulls 3R, 3L allows these lifting devices to not protrude or to only protrude slightly above the plane of the upper walls 30 when they are in the completely lowered configuration.

Returning to the elastic supports E2 which connect the ends of the plates L1, L2 to the two hulls 3R, 3L, these elastic supports also leave a certain possibility of relative movement to the hulls, ensuring the correct operation of the vehicle, while maintaining contact of all the wheels of the vehicle with the floor even when the latter presents irregularities and/or slope variations, without however requiring any constructive complication, and in particular without requiring the adoption of particularly sophisticated suspension systems in association with the wheels of the vehicle. The result of the above is, therefore, an extremely simple structure, which can be produced and assembled in a short time and with a very low production cost.

A further advantage of the structure described above is that it is constructed according to a modularity criterion, using a low number of standardizable components and, therefore, capable of being reconfigured in a simple and rapid way to be adapted to the needs of each specific application. In particular, the cross-members C1, C2 and the plates L1, L2 can be replaced with similar components of different length, to modify the transversal dimension of the vehicle, according to the configuration and dimensions of the structure to be transported. The wheel assemblies R1-R4 constitute the same number of modules that can also be easily replaced with different types of modules or which can be assembled according to different configurations, for example, to provide the drive wheels both at the front ends or both at the rear ends of the two hulls 3R, 3L. The same hulls 3R and 3L can be replaced with hulls of different length, for example, depending on the application requirements.

Again with reference to FIGS. 1, 2 and 3, the exemplary vehicle 1 structure finally comprises a front wall W1 and a rear wall W2 which connect the respective wheel assemblies R1, R2 and R3, R4 together. The walls W1, W2 have no load-bearing function and are connected to the respective wheel assemblies by means of flexible connecting elements of any known type (not shown), the walls W1, W2 (which could also be completely omitted) do not hinder the differentiated movements of the two hulls 3R, 3L.

Preferably, the two hulls also comprise a plurality of auxiliary wheels with multiple rolling elements, of the "omni-wheel" (omni-directional movement) type (not illustrated).

Figure 8:
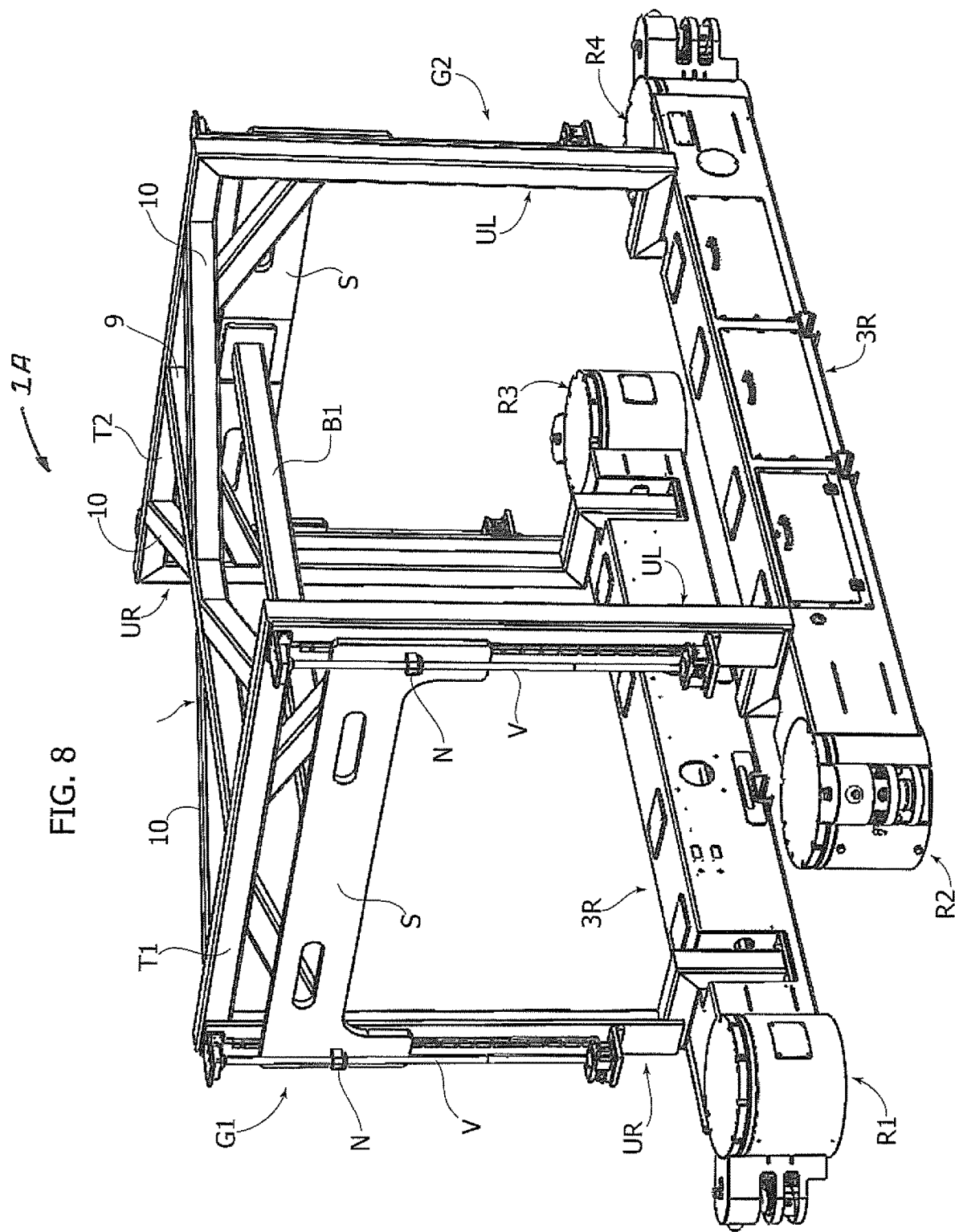
FIG. 8 is a front perspective view of a second embodiment of the vehicle according to the invention.

FIG. 8 shows a second embodiment 1A of the vehicle 1 according to the invention.

In this embodiment, the structure of the two hulls 3R, 3L, as well as the arrangement of the wheel assemblies R1-R4 at the front and rear ends of the two hulls remains unchanged. However, in this case, the cross-members C1, C2, the tool support plates L1, L2 and also the front and rear walls W1, W2 are completely eliminated; the bridge structures connecting the two hulls 3R, 3L together being two gantry structures G1, G2. Each of the gantry structures G1, G2 comprises two vertical uprights UR, UL which rise vertically starting from the two hulls 3R, 3L in areas adjacent to the front ends and to the rear ends of the two hulls, respectively. The uprights UR, UL have their upper ends connected by cross-members T1, T2. Moreover, in the preferred, non-exclusive embodiment shown here, the two upper cross-members T1, T2 of the two gantry structures G1, G2 are rigidly connected to each other by a connecting frame T which—in the illustrated example—includes a longitudinal central beam 9 and two pairs of bracing beams 10 which connect the central part of the beam 9 with end portions of the respective cross-member T1, T2. In this way, the two gantry structures G1, G2, together with the upper frame T, constitute a single rigid framework carried by the two hulls 3R, 3L. The advantage of this arrangement is that, in this way, the vehicle can be used in an assembly or processing station without interfering with an obstacle represented by a structure that is in the station, the vehicle 1A being able to straddle this obstacle.

In the case of this embodiment as well, the exemplary "base" configuration of the vehicle 1A can be provided with any type of equipment which makes it suitable for a specific application. By way of example, in the solution illustrated here, a sliding member S is slidably mounted on the uprights UR, UL of each gantry structure G1, G2. In the illustrated example, the sliding member S can be operated by means of a screw and nut system, including two nuts N associated with the sliding member S and engaged by threaded columns V which are axially stationary and which are selectively driven in rotation by respective electric motors (not illustrated). The actuation of the electric motors causes the vertical displacement of the sliding member S. Again, in the case of the preferred embodiment illustrated here, the two sliding members S associated with the two gantry structures G1, G2 are rigidly connected to each other by a longitudinal beam B1.

The structure consisting of the sliding members S and the beam B1 can be used to support a structure or a component which can then be lowered once the vehicle 1A has stopped in an assembly station, to carry said structure or said component in the vicinity of operative equipment.

Figure 9:
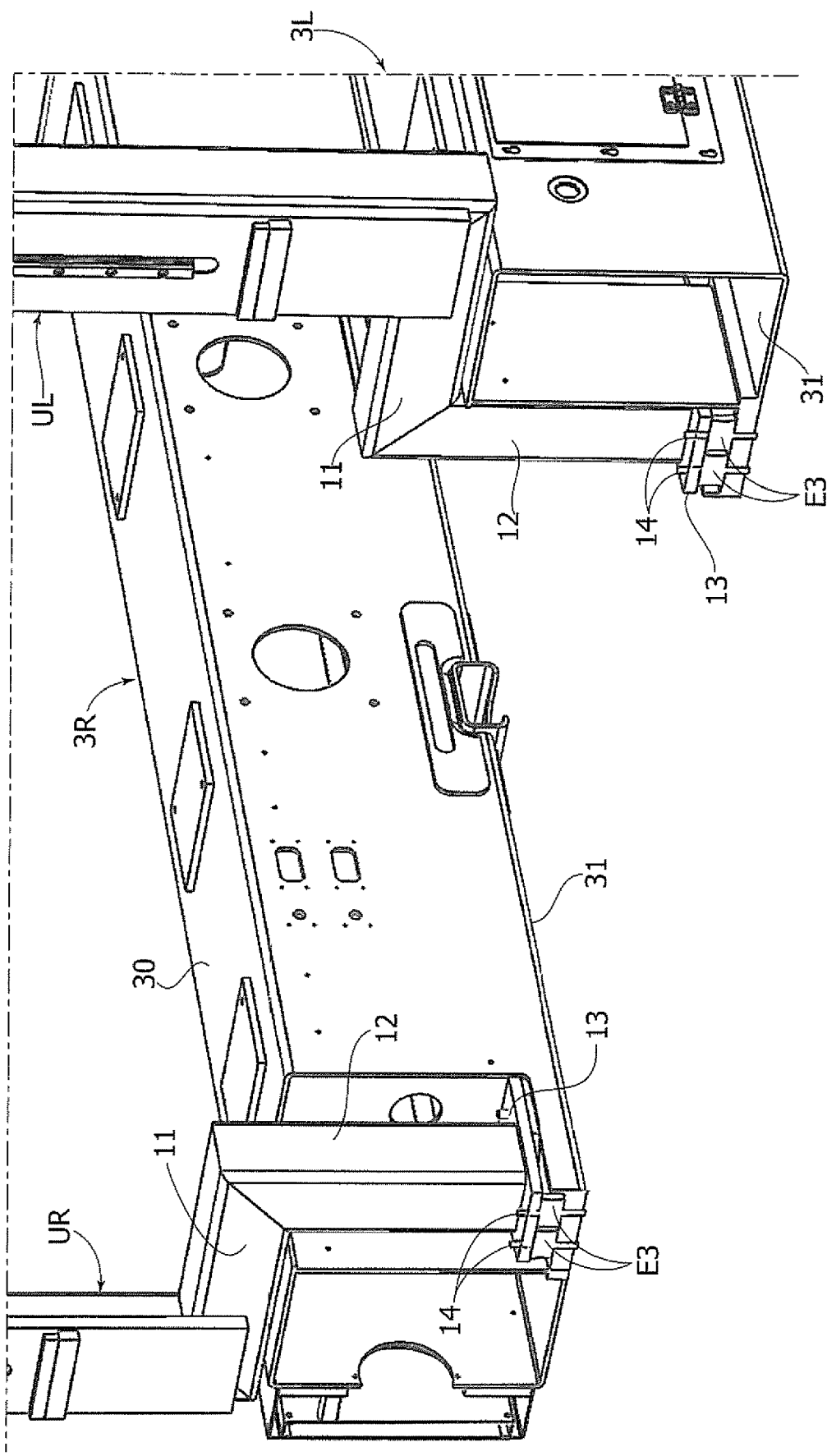
FIG. 9 is a partially cross-sectioned, partial perspective view of the vehicle of FIG. 8.

In the case of the embodiments of FIG. 8, maintaining all the wheels of the vehicle in contact with the surface on which the vehicle moves is guaranteed by the possibility of the two hulls 3R, 3L having reduced differentiated movements. This result is also obtained in this case due to the fact that the structures constituting the bridges between the two hulls 3R, 3L, or rather, in this case the two gantry structures G1, G2, are connected to the hulls by means of elastic joints. In particular, as shown in detail in FIG. 9, each of the uprights UR, UL has a lower end portion which is anchored to the respective hull by interposition of blocks of elastomeric material E3. With reference to FIG. 9, in the illustrated embodiment example, the lower part of each upright UR, UL has a horizontal portion 11 which extends above the upper wall 30 of the respective hull, which then extends into a vertical portion 12 whose lower end is welded to a horizontal plate 13. The horizontal plate 13 is connected by means of bolts 14 to the lower wall 31 of the respective hull by interposition of the elastic supports E3.

FIGS. 10-15 refer to another exemplary development vehicle 1B of the embodiment of FIG. 8, wherein it is also possible to transform the vehicle 1B into a configuration of reduced size, for example, to facilitate transport. FIGS. 14A, 14B, 14C show three successive steps of an operation by means of which the vehicle 1B can be folded into the reduced-size configuration, with the two hulls 3R, 3L arranged adjacent to each other and longitudinally offset. To this end, it is firstly envisaged that the alternate upper frame TA is removably connected to the two gantry structures G1, G2. In the example illustrated in FIG. 10, the frame TA consists of two beams arranged in an X shape, having their ends removably connected to the upper ends of the uprights UR, UL of the two gantry structures G1, G2. The removable connection can be made, for example, by bolts.

In the case of this embodiment, each of the uprights UR, UL of the two gantry structures G1, G2 has its lower end connected to the respective hull by the elastic blocks E3 of elastomeric material (FIG. 11) as already described with reference to the embodiment of FIGS. 8 and 9. In this case, however, an auxiliary upright 16 is hinged to each upright about a vertical axis X (see FIG. 13), by means of hinges 15. Again in this case, the two cross-members T1, T2 of the two gantry structures G1, G2 are connected to the upper ends of the two auxiliary uprights 16. Furthermore, the sliding members S are slidably mounted on the two auxiliary uprights 16 of each gantry structure.

Figure 12:
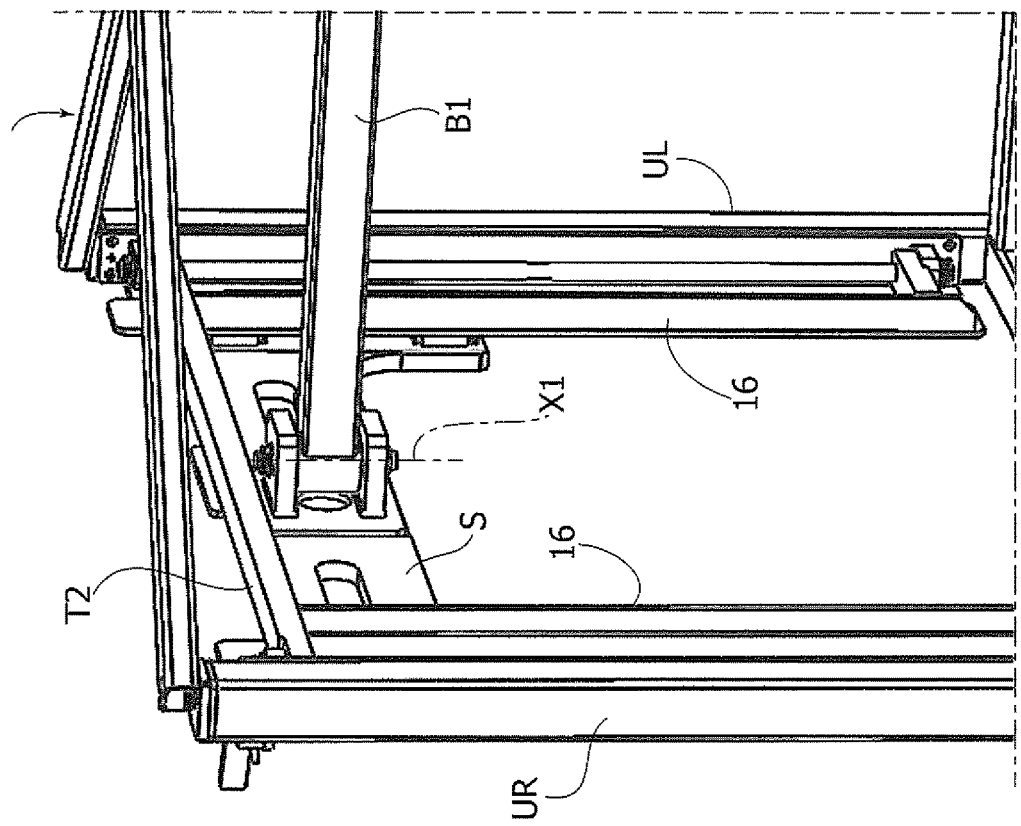

Again in the case of this embodiment, the beam B1 connecting the two sliding members S is connected to each sliding member S in an articulated manner about a vertical axis X1, as shown in FIG. 12.

Thanks to the aforesaid structure and arrangement, the entire structure of the vehicle 1B can be transformed, once the upper frame TA is removed, into the folded condition of reduced-size which is illustrated in FIGS. 14C, 15.

FIG. 14A shows a perspective view of the vehicle 1B in the operational configuration of use. FIG. 14B shows the vehicle 1B with the upper frame TA removed. FIGS. 14C and 15 are a perspective view and a plan view of the vehicle 1B in the folded configuration, in which the two hulls 3R, 3L are adjacent to each other, in a longitudinally offset position, and the two gantry structures G1, G2 are arranged in planes inclined with respect to a plane perpendicular to the longitudinal direction of the hulls. It should also be noted that, in the specific example illustrated in FIGS. 10-15, the connection of each of the uprights UR, UL to the respective hull is reinforced by a horizontal arm 13 which extends above the upper wall 30 of the respective hull starting from the portion 11 of the upright (see FIG. 11) and continuing (see FIG. 10) with a portion 14 perpendicular to the portion 13 and arranged transversely above the upper wall 30, and a vertically directed end portion 15, which is anchored to the inner side wall of the respective hull.

As is clear from the above description, the variant of FIGS. 10-15 presents, in addition to all the advantages that have been described above with reference to the other embodiments of the invention, the further advantage of making the operation of transporting the vehicle 1B to another production site extremely simple and rapid, as it is possible to fold the vehicle into a reduced-space configuration, without having to perform complex disassembly operations.

Of course, the configuration chosen to give the structure of the vehicle 1B the possibility of being folded into a reduced overall configuration, with the two hulls in adjacent positions to each other, may also be different from the one illustrated here purely by way of example.

As already indicated, whatever the "base" configuration of the vehicle 1, 1A or 1B, it can then be implemented with additional equipment, depending on the specific needs of each application.

Figure 10:
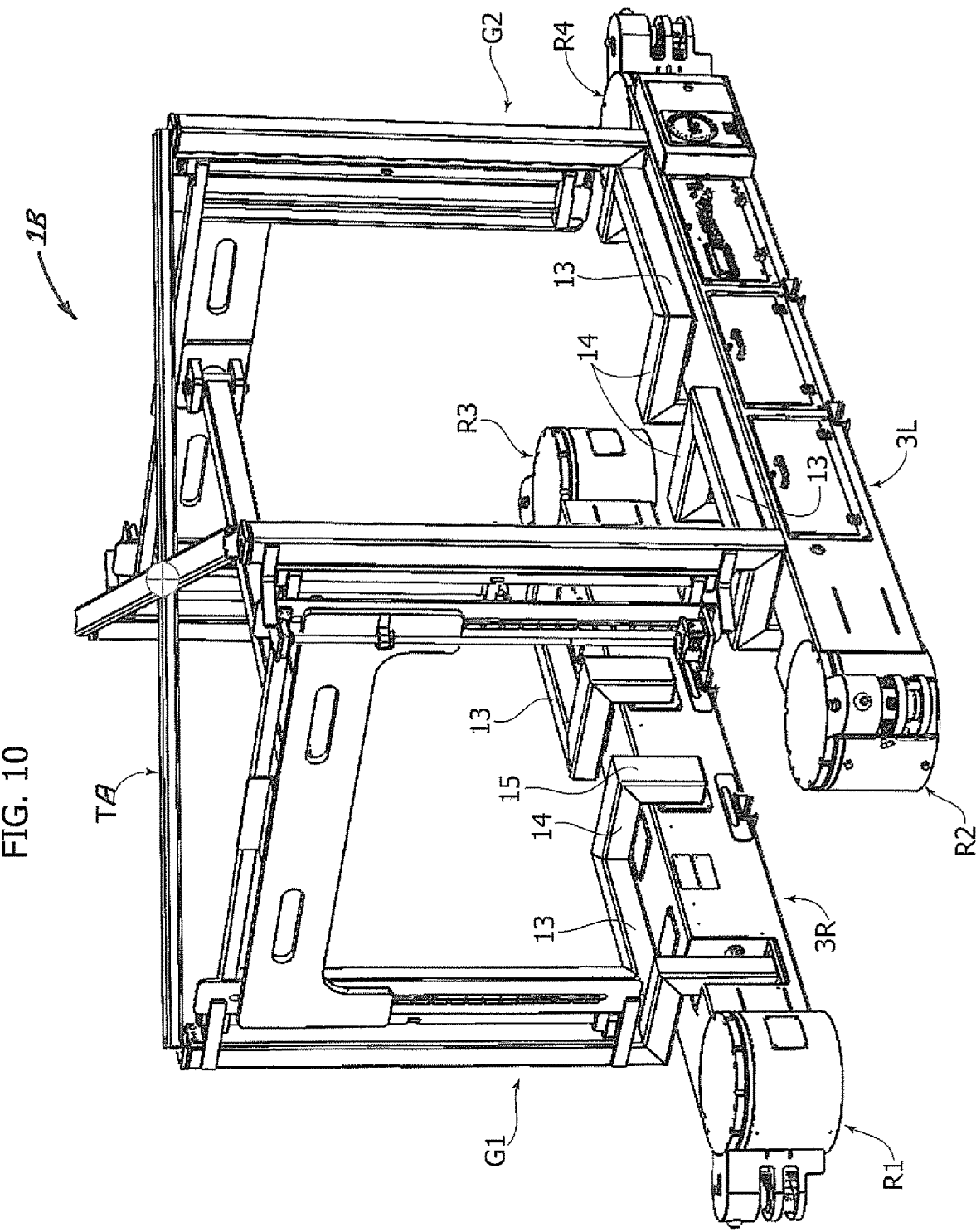
FIG. 10 is a front perspective view of a third embodiment of the vehicle according to the invention.
Figure 11:
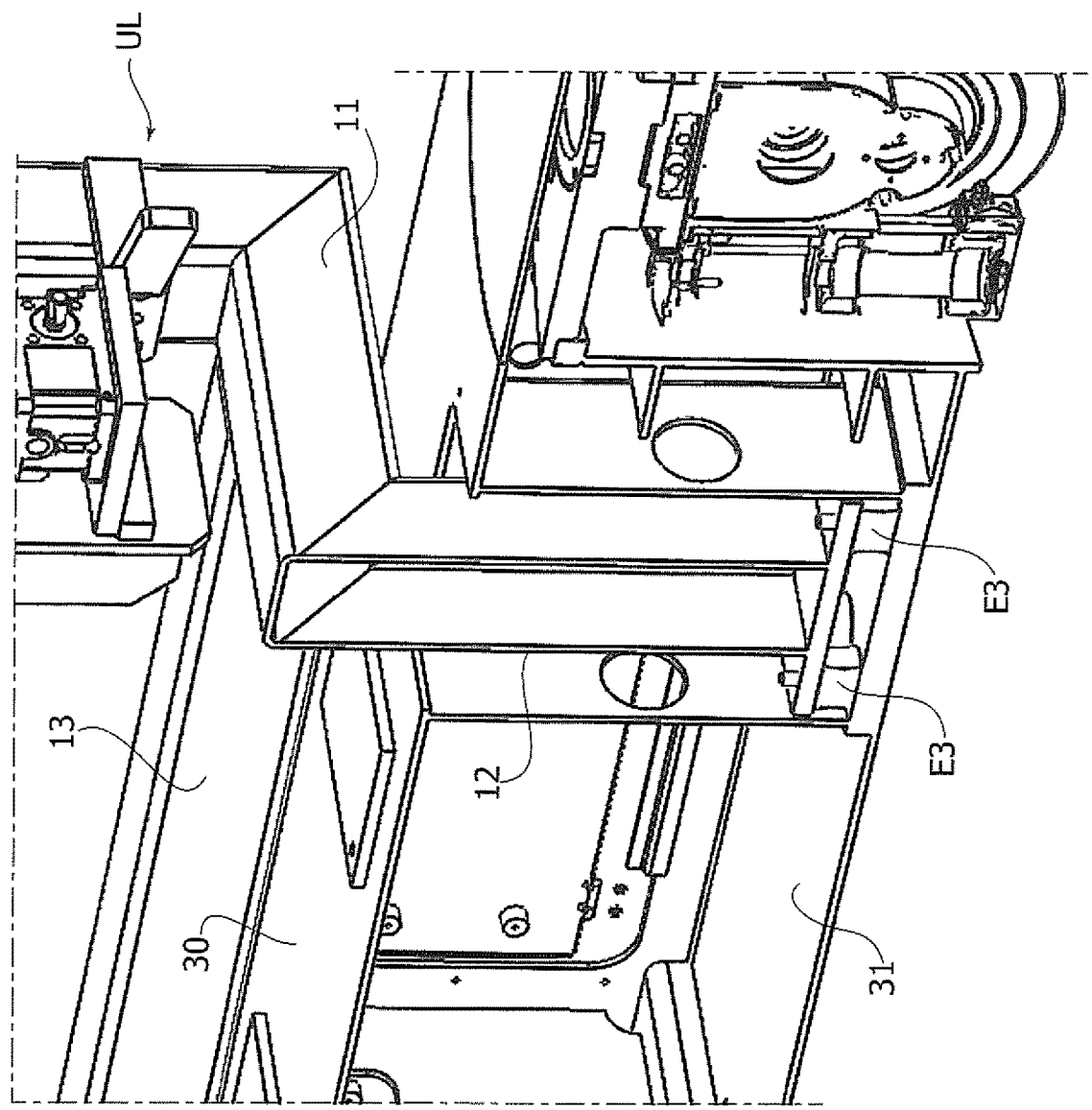
FIG. 11 is a partially cross-sectioned perspective view of a detail of the vehicle structure of FIG. 10, FIGS. 12, 13 are additional partial perspective views that illustrate respective further details of the vehicle of FIG. 10.
Figure 13:
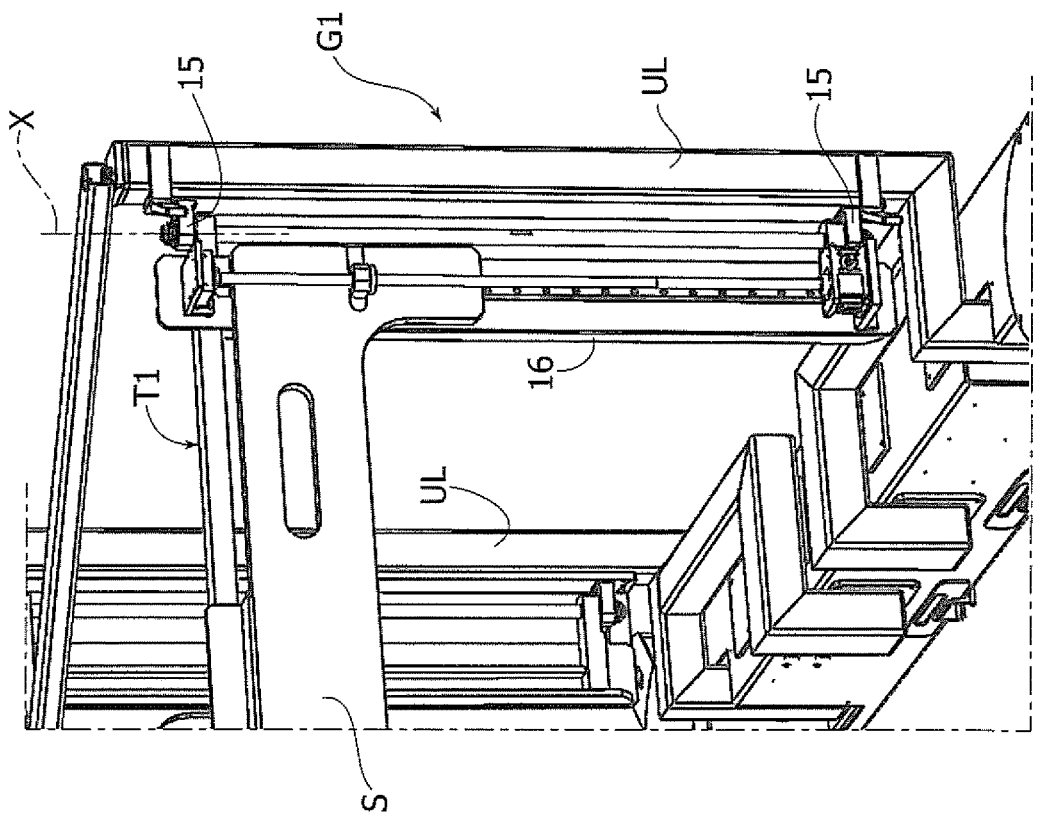
Figure 17:
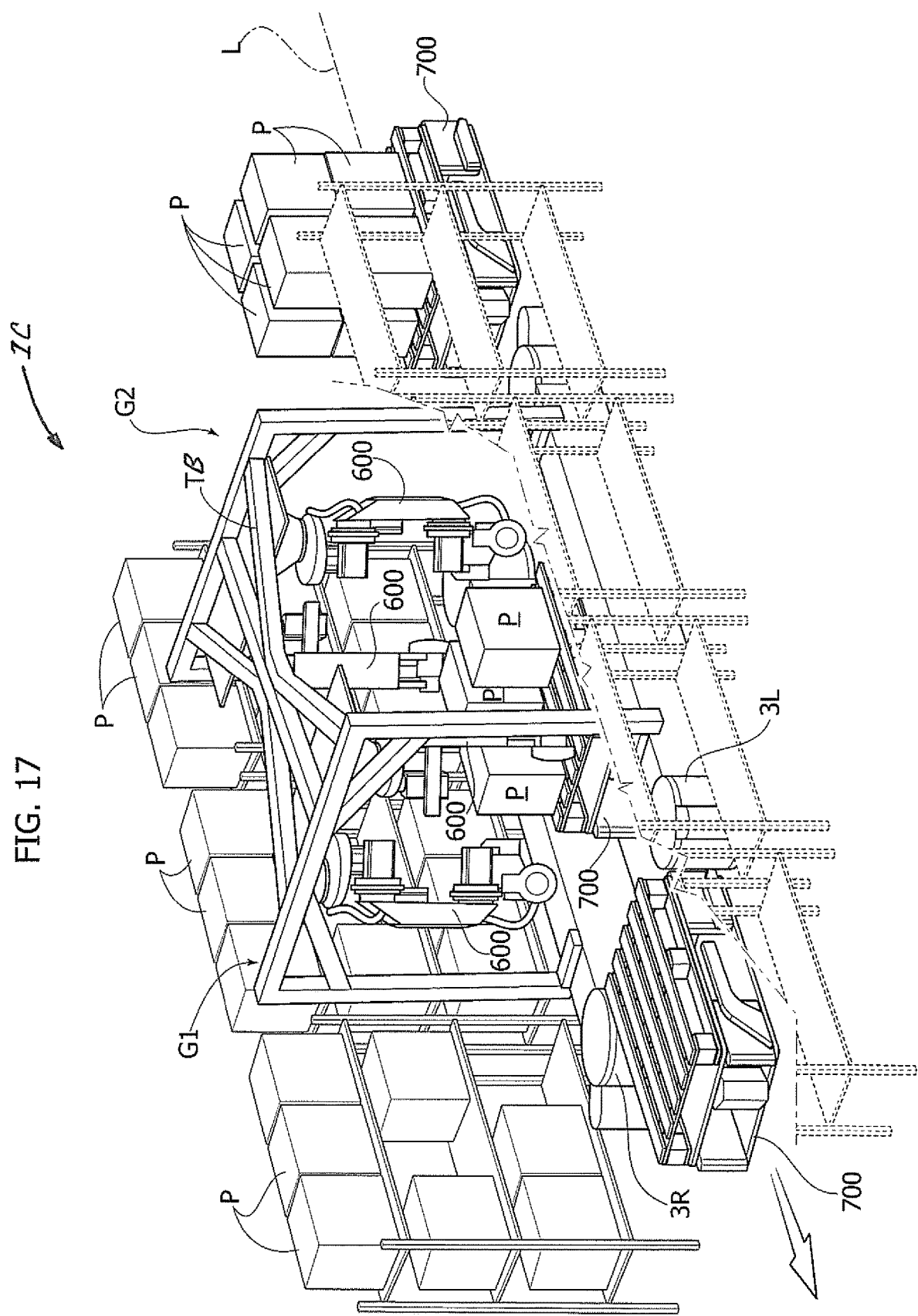
FIG. 17 is a schematic perspective view of an additional variant of the vehicle according to the invention.

FIG. 17 shows an additional example vehicle 1C, in which the "base" structure of the vehicle, in a configuration with gantry structures, as described with reference to FIGS. 8 and 10, is completed with robotic arms 600. The robotic arms 600 are upside down manipulator robots of any known type carried by the superstructures which are mounted on the hulls 3R, 3L and which include the two gantry structures G1, G2. In the illustrated example, the arms 600 are carried by longitudinal upper beams TB which connect the gantry structures G1, G2. The robotic arms 600 can be used for picking up components P from one or more stationary positions (for example, shelves) at the side of the line, and for depositing picked-up components onto pallets which, in turn, are moved by AGVs 700 that proceed along an assembly line L. The vehicle 1C according to the invention is arranged astride the line. The combination of two types of autonomous vehicles (vehicle 1C with gantry structures and vehicles 700) allows optimization of efficiency, taking advantage of their respective specificities.

Of course, without prejudice to the principle of the invention, the details of construction and the embodiments may vary widely with respect to those described and illustrated purely by way of example, without departing from the scope of the present invention.

What is claimed is:

1. An autonomous vehicle in the form of an automated guided vehicle or an autonomous mobile robot comprising:
   a support structure;
   a plurality of wheels on which said support structure is carried;
   at least one electric motor carried by the support structure and engaged with the at least one of said wheels, the at least one electric motor operable to selectively rotate the engaged at least one of said wheels; and
   one or more electronic control circuits carried by the support structure;
   said vehicle being characterized in that:
   the support structure comprises a double-hull configuration, with two separate hulls, parallel to each other and transversely spaced apart, and at least two bridge structures which connect said two hulls to each other;
   said plurality of wheels comprises two front wheels and two rear wheels respectively located near a front end and a rear end of the two hulls; and
   said at least two bridge structures have ends connected to the respective two hulls by interposition of elastic joints;
   in such a way that the two hulls are free to perform differentiated oscillating movements so as to allow the two front wheels and the two rear wheels to remain in contact with a surface on which the vehicle moves, even when the surface has irregularities or slope variations.

2. The autonomous vehicle of claim 1, wherein said front wheels and said rear wheels respectively form part of wheel assemblies constituting separate modules, rigidly connected to the respective front end and the rear end of the two hulls.

3. The autonomous vehicle of claim 2, wherein at least two of said wheel assemblies each comprise a steering and drive wheel and wherein the at least one electric motor comprises a first electric motor operable to drive the wheel and a second electric motor operable to steer the wheel.

4. The autonomous vehicle of claim 3, wherein two of said wheel assemblies each comprise a non-drive pivoting wheel.

5. The autonomous vehicle of claim 1, wherein each of said two hulls has a structure of metal material, comprising an upper wall, a lower wall and two side walls.

6. The autonomous vehicle of claim 5, wherein at least one of the two hulls further comprises one or more containment spaces, provided with openable doors operable to contain one or more electronic processing and control units and the respective wiring.

7. The autonomous vehicle according to claim 1, wherein said at least two bridge structures further comprise a first cross-member and a second cross-member, each of the first and second cross members having a cylindrical tubular body having two opposite ends connected to respective of the two hulls by interposition of two elastic joints, the two elastic joints each including an annular body of elastomeric material, coaxial with the cylindrical tubular body of the cross-member.

8. The autonomous vehicle according to claim 1, wherein said at least two bridge structures further comprise a first and a second tool support plate, arranged in horizontal planes and having each opposite end resting on respective support surfaces of the two hulls each connected to the respective support surface by interposition of one or more elastic supports of elastomeric material.

9. The autonomous vehicle of claim 8, wherein each of the two hulls has a structure of metal material, comprising an upper wall, a lower wall and two side walls, and in that the support surface of each tool support plate on the hull is defined by the lower wall of the hull.

10. The autonomous vehicle of claim 1 further comprising a lifting device configured to vary the height position of a structure transported above the vehicle is arranged above each tool support plate.

11. The autonomous vehicle of claim 1 further comprising at least one auxiliary omni-wheel connected to each of the two hulls, each omni wheel including multiple rolling elements.

12. The autonomous vehicle of claim 1, wherein the two bridge structures comprise two gantry structures, each including two uprights, which rise vertically from respective of the two hulls and having upper ends connected by a cross-member, in such a way that a space between the two hulls below the cross-member is completely free from support structure, each upright of each gantry structure having a lower end connected to a respective hull of the support structure of the vehicle by interposition of the elastic joint.

13. The autonomous vehicle of claim 12, wherein the two cross-members of the two gantry structures are connected to each other by an upper frame.

14. The autonomous vehicle of claim 13, wherein a sliding member is mounted on the two uprights of at least one of the two gantry structures in a vertically slidable manner.

15. The autonomous vehicle of claim 13, wherein respective sliding members are mounted on the uprights of both of the two gantry structures, in a vertically slidable manner, which are rigidly connected to each other by an interconnection structure.

16. The autonomous vehicle of claim 1, wherein the support structure is formed so as to be selectively foldable in an inoperative configuration of reduced size, with the two hulls adjacent to one another.

17. The autonomous vehicle of claim 12, wherein on each upright of each of the two gantry structures, an auxiliary upright is hinged about a vertical axis, to which the upper cross-member of the respective gantry structure is connected, in such a way that the vehicle is able to selectively assume a folded configuration of reduced size, in which the two hulls are adjacent and longitudinally offset from each other, and the two gantry structures are arranged in inclined planes with respect to a plane perpendicular to the longitudinal direction of the two hulls.

18. The autonomous vehicle of claim 17, wherein the two cross-members of the two gantry structures are connected to each other by an upper frame which is removably mounted, so the upper frame can be removed before transforming the vehicle into the folded configuration of reduced size.

19. The autonomous vehicle of claim 17, wherein respective sliding members are vertically mounted on the auxiliary uprights of both the two gantry structures, the respective sliding members are connected to each other by an interconnection beam having opposite ends articulated to the two sliding members about vertical axes.

20. The autonomous vehicle of claim 12, wherein the two gantry structures support, directly or indirectly, a robotic arm.

21. An industrial plant comprising:
an assembly line;
a plurality of automated guided vehicles (AGVs) arranged to proceed along said assembly line and to receive components thereon; and
at least one autonomous vehicle according to claim 20, arranged astride the assembly line and programmed to selectively pick up components by said robotic arm from at least one stationary position at a side of the line and to selectively deposit the picked-up components onto the plurality of AGVs which proceed along the line.

* * * * *